United States Patent [19]

Malczyk

[11] Patent Number: 5,241,781
[45] Date of Patent: Sep. 7, 1993

[54] HOUSE PLANT HOSPITAL

[76] Inventor: Thomas R. Malczyk, P.O. Box 245, Nanticoke, Pa. 18634

[21] Appl. No.: 746,608

[22] Filed: Aug. 19, 1991

[51] Int. Cl.$^5$ .......................... A01G 9/00; A47G 7/02
[52] U.S. Cl. .......................................... 47/17; 47/39; 47/60
[58] Field of Search ................ 47/59, 60, 61, 62, 65, 47/79, 39, 66, 48.5, DIG. 6

[56] References Cited

U.S. PATENT DOCUMENTS

| | | | |
|---|---|---|---|
| 3,328,912 | 7/1967 | Poon | 47/61 |
| 3,360,885 | 1/1968 | Clair | 47/39 |
| 3,380,190 | 4/1968 | Granger | 47/39 |
| 4,051,627 | 10/1977 | Schilling, Jr. | 47/79 |
| 4,175,354 | 11/1979 | Anderson | 47/39 |
| 4,198,783 | 4/1980 | Leroux | 47/60 |
| 4,250,666 | 2/1981 | Rakestraw | 47/65 |
| 4,543,744 | 10/1985 | Royster | 47/60 |
| 4,850,135 | 7/1989 | DeMarco | 47/DIG. 6 |

*Primary Examiner*—David A. Scherbel
*Assistant Examiner*—Michele A. Van Patten

[57] ABSTRACT

A house plant hospital comprises a closed container in which a potted plant may be positioned and covered by a hingedly-attached lid. A plurality of lights are mounted within the container, while the plant may be occasionally rotated by being positioned upon a "lazy susan" support. In an alternative embodiment, provision is made for supporting several layers of plants and a water spray system is also provided. Additionally, fertilizer and pesticides may be sprayed over the plants while they are retained within the container. The closed container positionable over the plants operates to retain heat provided by the artificial light source so as to prevent the plants from being damaged in a cold environment. Further, the interior surfaces of the container and its associated lid are completely covered with a reflective mylar material which is unaffected by the liquid spray and which operates to continually reflect the artificial light in all directions so that maximum light availability is provided for the plants.

3 Claims, 4 Drawing Sheets

PRIOR ART

HOUSE PLANT HOSPITAL

BACKGROUND OF THE INVENTION

1. Field of the Invention

The present invention relates to an apparatus for stimulating plant growth under controlled conditions and more particularly pertains to a closed plant-holding container which is provided with an artificial light source as well as means for providing various liquids to the encapsulated plants.

2. Description of the Prior Art

The providing of artificial light to plants retained within closed containers is well known in the prior art. For example, U.S. Pat. No. 4,196,544, which issued to Davis et al. on Apr. 8, 1980, discloses a chamber for cultivating plant growth utilizing a plurality of light fixtures wherein the lights are employed to artificially control plant growth. The structure illustrated in this patent requires the use of a completely closed building structure utilizing a plurality of ventilating fans and a flow of cooling water to remove excess heat from the structure.

U.S. Pat. No. 4,250,666, which issued to R. Rakestraw on Feb. 17, 1981, discloses a supporting structure for plants which includes a plurality of rotatable trays or shelves mounted on a central support wherein the trays are utilized to retain potting soil and plants. Additionally, means are provided for illuminating the plants to facilitate their growth by an artificial light source. While being functional for its intended purpose, the Rakestraw device does not utilize a closed container whereby much of the artificial light is dissipated as is the heat provided by the artificial light sources. As such, only minimal usage of the artificial light and its attendant heat is made use of.

Another patent of interest is U.S. Pat. No. 4,850,135, which issued to J. DeMarco on Jul. 25, 1989, wherein an apparatus for stimulating plant growth under controlled conditions utilizes a housing having florescent lamps retained therein. Lamps are mounted within the interior for the purpose of stimulating growth of the plants and a reflective surface is utilized on the interior of the housing. While being quite functional for its intended purpose, the DeMarco apparatus is of a complex manufactured design which employs the process of vacuum metalization to obtain a reflective interior surface. Further, no provision is made for waterproofing the florescent lamp connections whereby a water spray can be safely utilized within the container, nor can a plant positioned within the container be rotated so as to achieve a more even light distribution.

As is now apparent, there are many different types of illuminated containers and the like for stimulating plant growth. However, these devices are either substantially complex in construction (and thus expensive to manufacture) or they are so simply constructed that substantial inefficiency results. As such, it can be appreciated that there exists a continuing need for new and improved house plant containers which allow stimulated growth through the employment of artificial light and in this connection, the present invention substantially fulfills this need.

SUMMARY OF THE INVENTION

In view of the foregoing disadvantages inherent in the known types of growth stimulating plant containers now present in the prior art, the present invention provides an improved growth stimulating plant container construction wherein the same can be utilized as a house plant hospital as well as provide year round growth capabilities to plants which are normally climate conscious. As such, the general purpose of the present invention, which will be described subsequently in greater detail, is to provide a new and improved growth stimulating plant container which has all the advantages of the prior art growth stimulating plant containers and none of the disadvantages.

To attain this, the present invention essentially comprises a house plant hospital consisting of a closed container in which a potted plant may be positioned and covered by a hingedly-attached lid. A plurality of lights are mounted within the container, while the plant may be occasionally rotated by being positioned upon a "lazy susan" support. In an alternative embodiment, provision is made for supporting several layers of plants and a water spray system is also provided. Additionally, fertilizer and pesticides may be sprayed over the plants while they are retained within the container.

The closed container positionable over the plants operates to retain heat provided by the artificial light sources so as to prevent the plants from being damaged in a cold environment. Further, the interior surfaces of the container and its associated lid are completely covered with a reflective mylar material which is unaffected by the liquid spray and which operates to continually reflect the artificial light in all directions so that maximum light availabily is provided for the plants.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved growth stimulating plant container which has all the advantages of the prior art growth stimulating plant containers and none of the disadvantages.

It is another object of the present invention to provide a new and improved growth stimulating plant container which may be easily and efficiently manufactured and marketed.

It is a further object of the present invention to provide a new and improved growth stimulating plant container which is of a durable and reliable construction.

An even further object of the present invention is to provide a new and improved growth stimulating plant container which is susceptible of a low cost of manufacture with regard to both materials and labor, and which accordingly is then susceptible of low prices of sale to the consuming public, thereby making such growth stimulating plant containers economically available to the buying public.

Still yet another object of the present invention is to provide a new and improved growth stimulating plant container which provides in the apparatuses and methods of the prior art some of the advantages thereof, while simultaneously overcoming some of the disadvantages normally associated therewith.

Still another object of the present invention is to provide a new and improved growth stimulating plant container which can be efficiently utilized as a house plant hospital.

Yet another object of the present invention is to provide a new and improved growth stimulating plant container which facilitates a year round growth condition for plants which are normally climate conscience.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENTS

Figure 1:
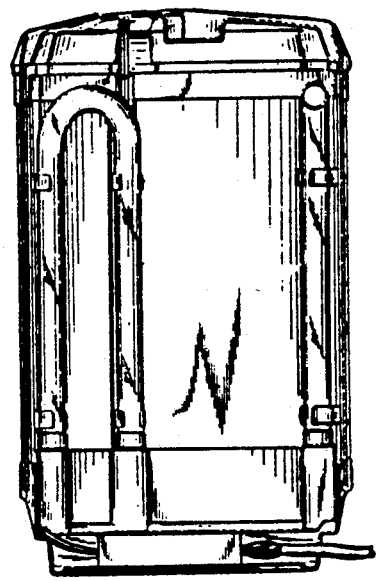
FIG. 1 is a cross-sectional elevation view of a prior art growth stimulating plant container.

With reference now to the drawings, a new and improved growth stimulating plant container embodying the principles and concepts of the present invention and generally designated by the reference numeral 10 will be described.

Figure 2:
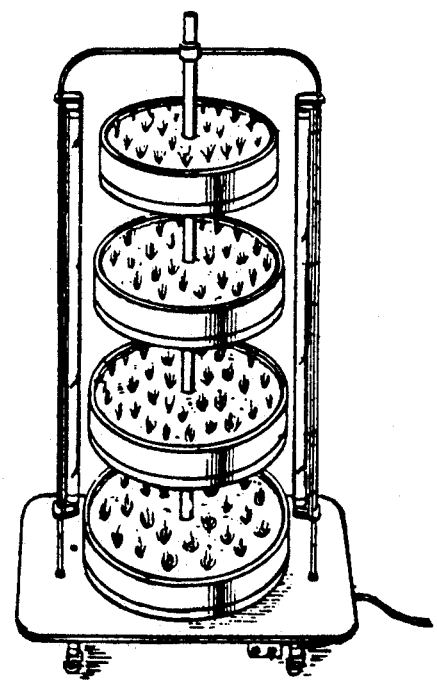
FIG. 2 is a perspective view of another prior art growth stimulating plant support.

Initially however, reference is made to FIGS. 1 and 2 of the drawings wherein typical prior art growth stimulating plant supports are illustrated. As aforediscussed, FIG. 1 illustrates an apparatus for stimulating plant growth under controlled conditions as particularly described in U.S. Pat. No. 4,850,135. Similarly, as also aforediscussed, FIG. 2 illustrates a supporting structure for plants which provides for artificial illumination as particularly described in U.S. Pat. No. 4,250,666. Both of these prior art devices are illustrative of the problems which the present invention is attempting to overcome. In this regard, FIG. 1 illustrates a highly efficient device which is difficult and expensive to manufacture, while FIG. 2 illustrates a less efficient device which may be manufactured inexpensively but which sacrifices control of the emitted light and heat.

Figure 3:
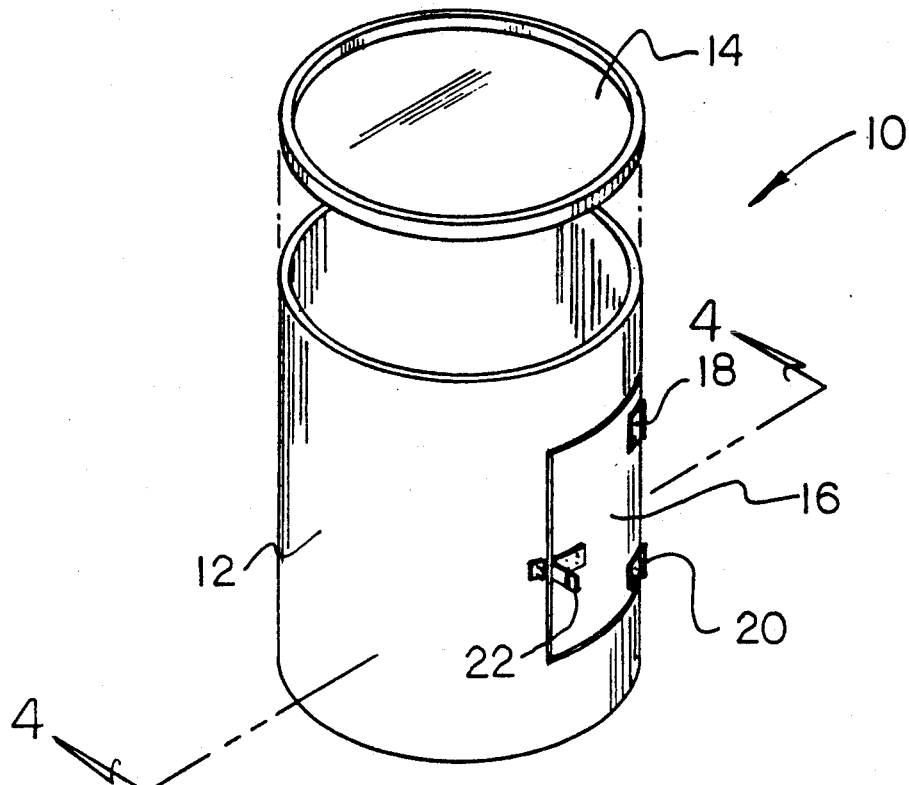
FIG. 3 is a perspective view of the growth stimulating plant container comprising the present invention.
Figure 4:
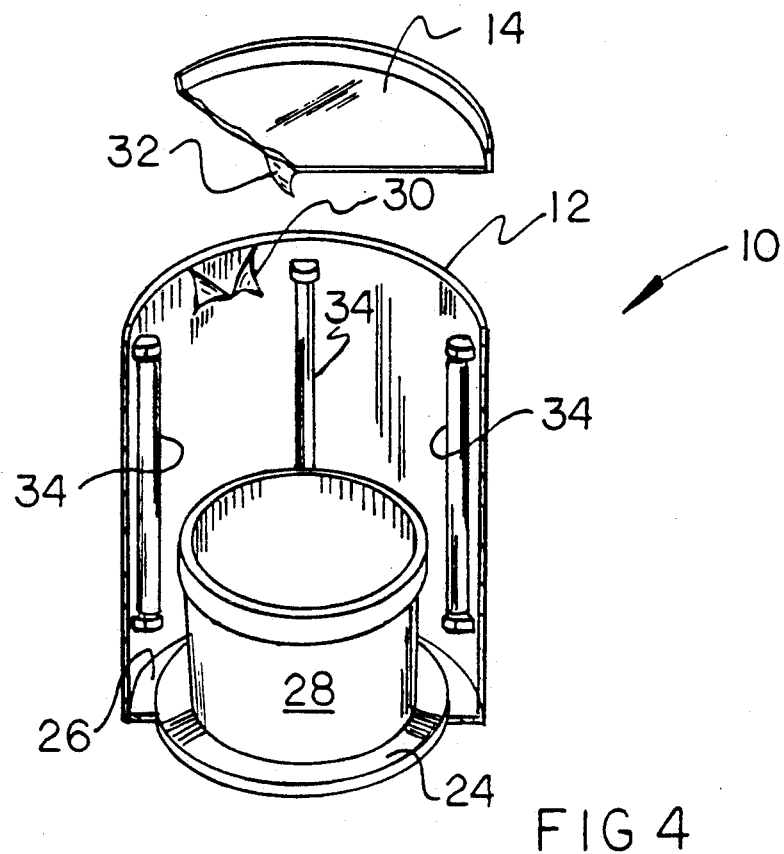
FIG. 4 is an exploded cross-sectional perspective view of the present invention.

FIGS. 3 and 4 illustrate a first embodiment 10 of the invention which attempts to solve some of these prior art problems. As illustrated, the embodiment 10 comprises a cylindrical container 12, which might be a fifty-five gallon barrel or the like, having a removable lid 14 which, in a preferred embodiment, will be hingedly attached to the barrel. A door 16 is cut into the side of the barrel 12 and is attached thereto by a pair of hinges 18,20. A conventional latch 22 may be used to hold the door 16 in a closed position when desired.

A rotatable support 24, such as a "lazy susan", is positioned in the bottom 26 of the barrel 12, and a flower pot or other plant container 28 may then be positioned on the support 24 as best illustrated in FIG. 4.

The interior surface of the barrel 12 is covered with a sheet of flexible mylar 30 and a further mylar sheet 32 is mounted on a bottom interior portion of the lid 14. As is well known in the art, the mylar 30,32 is very flexible and durable, as well as being light reflective and impervious to moisture. Once the mylar sheets 30 are adhesively attached to the interior circumferential surface of the barrel 12, a plurality of florescent lights 34 are vertically amounted around the barrel's peripheral interior surface. In the preferred embodiment, the florescent lights 34 would be spaced about 18 inches apart and would be of the variety which is approximately 25 inches long. The plurality of florescent lights 34 are interconnected by a conventional parallel electric circuit, as well as a conventional on/off switch, so that they may be selectively operated when desired.

With respect to the manner of operation of this first embodiment lo of the invention, it can be appreciated that a plant which is growing in a pot 28 may be positioned on the "lazy susan" 24 as shown in FIG. 4. The hinged lid 14 may then be closed over the plant and the florescent lights 34 are illuminated to provide an artificial growth stimulating light source for the plant. Occasionally, the lid 14 or the door 16 may be opened so that the plant can be rotated by means of the rotatable base 24 in a now apparent manner, while the reflective mylar creates a strong lighting effect over and around any plants contained within the container 28. When the lid 14 is closed, the florescent lights 34 emit a small amount of heat which is captured within the container 12 so as to provide a warm environment which can be very useful under cold climatic conditions. As such, year round growth of a plant within the plant container 10 can be achieved.

Figure 5:
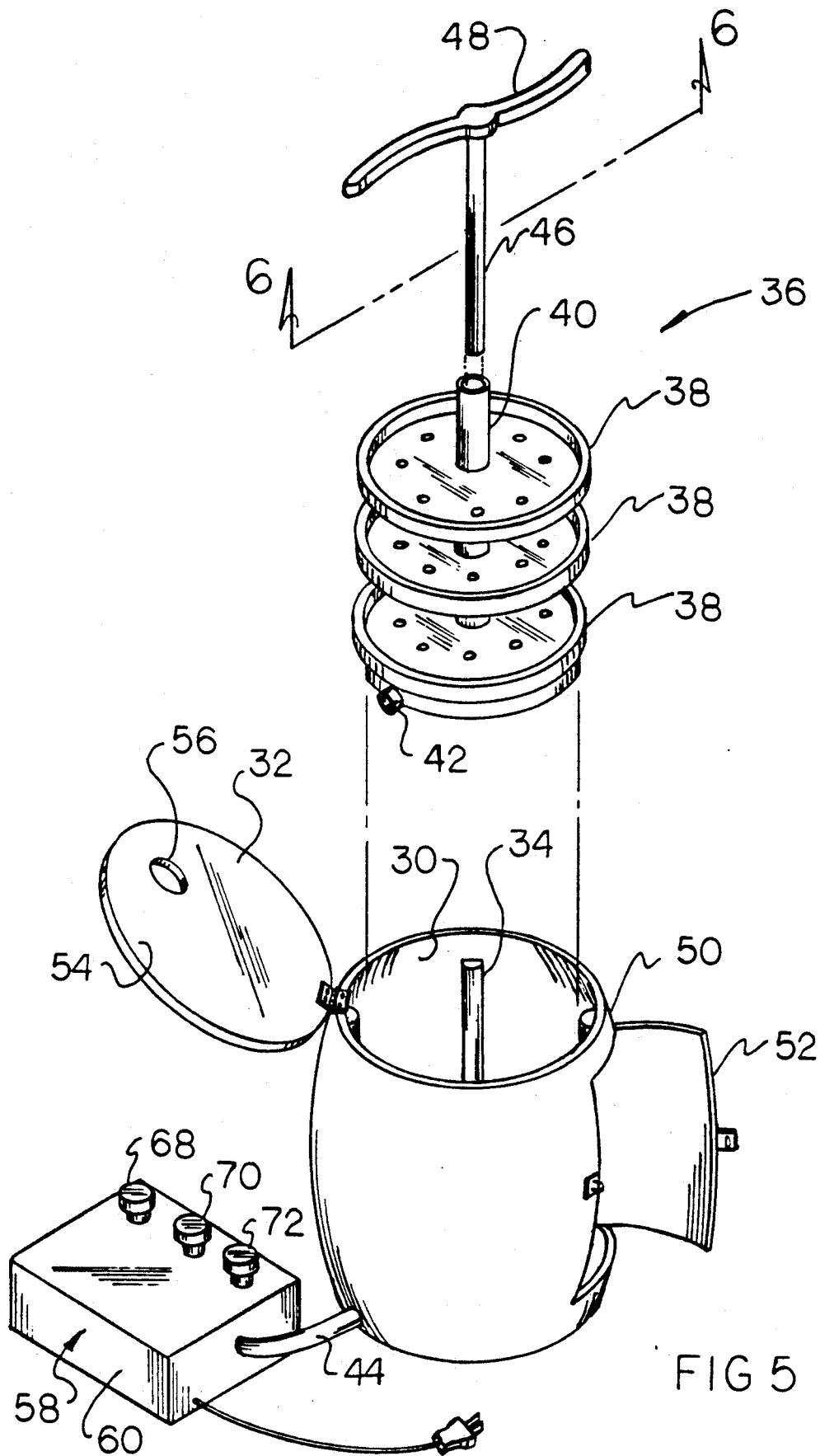
FIG. 5 is an exploded view of a second embodiment of the invention.

A modified embodiment of the invention is illustrated in FIG. 5 with this second embodiment being generally designated by the reference numeral 36. The second embodiment 36 includes one or more rotatable trays, each of which is generally designated by the reference numeral 38, with all of these rotatable trays being individually positioned on a centrally disposed shaft 40. A water inlet nozzle 42 is alignable with a water supply conduit 44 and attachable thereto by some conventional means, such as a frictional fit for the like, and this conduit is in fluid communication with the centrally disposed hollow shaft 40. As such, water supplied through the flexible conduit 44 is directed upwardly to the center of the shaft 40 and into a removable tube 46. The removable hollow tube 46 has a rotatable water spray head 48 fixedly secured to a top portion thereof as will be subsequently discussed in greater detail.

The embodiment 36 also includes a plurality of vertically aligned florescent lights 34 mounted within a rain barrel shaped container 50. The container 50 includes a hingedly attached door 52 and a hingedly attached lid 54 with all of the interior surfaces being coated with sheets of mylar 30,32. Additionally, a through-extending opening 56 is formed in the lid 54 with this opening being designed to receive an incandescent light bulb for the purpose of providing additional illumination and a much greater source of heat. In the preferred embodiment, a seventy-five watt incandescent light bulb would be mounted through the hole 56.

Figure 7:
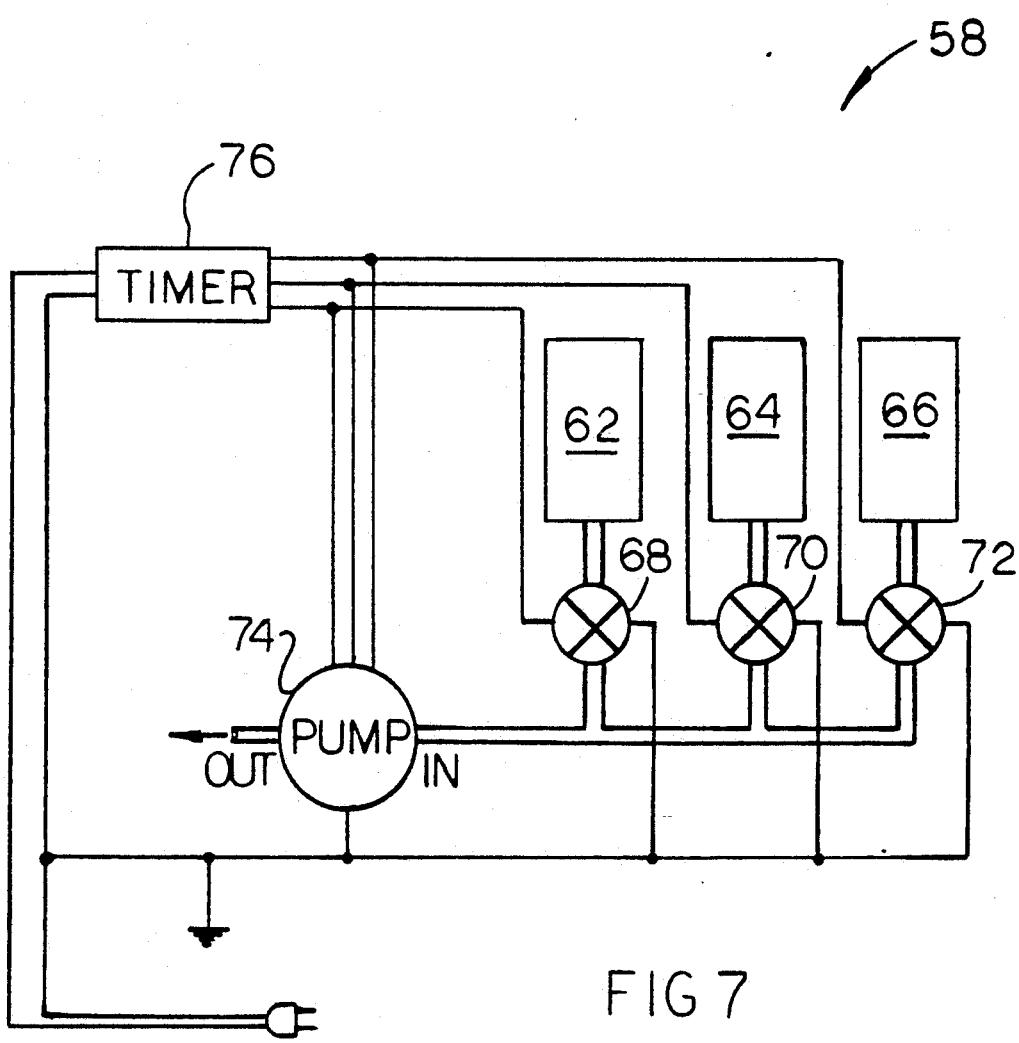
FIG. 7 is an electrical schematic associated with the second embodiment of the invention.

With particular reference to FIG. 7 in conjunction with FIG. 5, it can be seen that a liquid supply assembly 58 may be enclosed in a housing 60. Within the housing 60, there will be supplied several reservoirs 62,64,66 which are respectively filled with a pesticide, a fertilizing liquid, and a supply of water. Metering valves 68,70,72 are manually adjustable to control the amounts of liquid delivered from the respective containers 62,64,66 and an interiorly mounted pump 74 operates to draw the liquids from the containers and deliver them to the rotatable spray head 48. The operation of the device can be controlled by a conventional timer 76 which controls the operation of the pump in a well known and conventional manner.

Figure 6:
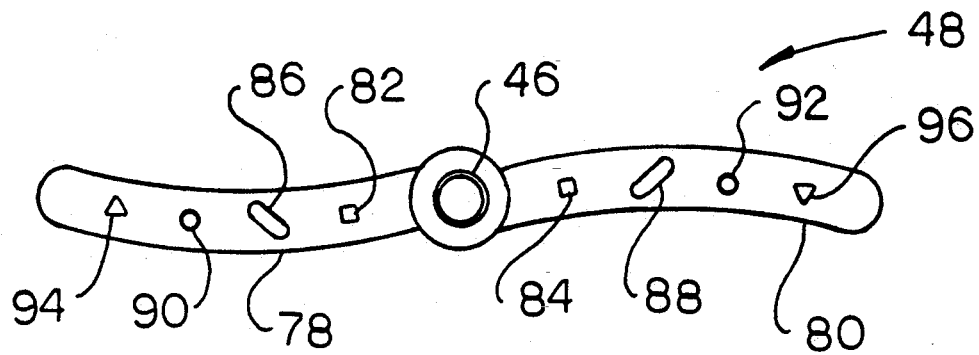
FIG. 6 is a bottom plan view of the sprayer forming a part of the present invention as viewed along the lines 6—6 in FIG. 5.

FIG. 6 of the drawings illustrates the novel construction of the rotatable spray head 48 which is positionable within the liquid supply conduit 40. The spray head 48 includes two oppositely disposed curvilinearly shaped hollow arms 78,80 which are integrally attached to the liquid supply conduit 46. To achieve a very unique liquid misting and distribution within the container 50, different shapes of liquid ejecting apertures are formed on the bottom of the arms 78,80, thereby to achieve a preprogrammed liquid misting distribution. In this regard, a first set of apertures formed on a bottom surface of the arms 78,80 are square shaped and are respectively designated by the reference numerals 82,84. Continuing in a radial direction outwardly from the conduit 46, a second oppositely disposed set of apertures 86,88 are angled away from each other, as well as from the central shaft 46, and are of a "capsule" shape. At a further radial distance from the central shaft 46, a third set of oppositely disposed appatures 90,92 are of a circular shape, while at a maximum radial distance from the shaft, a fourth set of oppositely disposed apertures 94, 96 are of a triangular shape.

As can be appreciated, when the sprayer head 48 is rotating at high speed and the liquid in the conduit 46 is pressurized, streams of liquid are emitted from the apertures 82-96 with each stream assuming the shape of the aperture through which it is passing. These variously shaped streams collide to provide a very diverse yet predictable pattern which was discovered through experiment and which operates to disperse variously sized droplets of liquid completely around and through the leaves of a plant.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters Patent of the Unites States is as follows:

1. A new and improved house plant hospital comprising:
   container means in which a plant is removably positionable;
   lid means for sealing said container means;
   door means for accessing said plant through a side portion of said container means;
   reflective surface means covering an interior portion of said container means and said lid means, said reflective surface means including a flexible sheet of reflective mylar adhesively attached to said lid means and said container means;
   rotation means on which said plant is positionable, whereby said plant can be selectively rotated within said container means, said rotation means including at least one rotatable tray;
   sprayer means for distributing a liquid within said container means over said plant, said sprayer means including a pump for distributing said liquid, said liquid including at least one of a pesticide, a supply of water and a liquid fertilizer, said sprayer means further including a rotatable sprayer head for distributing said liquid, said sprayer head including radially extending apertures through which said liquid is dispensed, said apertures varying in shape and size to obtain a predetermined liquid distribution;
   illumination means for providing a source of artificial light to stimulate growth of said plant, said illumination means including at least one fluorescent light.

2. The new and improved house plant hospital as described in claim 1, wherein said radially extending apertures include at least four pairs of differently shaped and sized apertures symmetrically radially disposed along opposed axially-aligned arms forming a part of said rotatable sprayer head.

3. The new and improved house plant hospital as described in claim 2, wherein at least one of said four pairs of apertures includes square-shaped apertures and wherein at least a second of said four parts of apertures includes triangularly-shaped apertures.

* * * * *